United States Patent [19]

Butler et al.

[11] Patent Number: 4,934,486

[45] Date of Patent: Jun. 19, 1990

[54] STABILIZED VEHICULAR STEP BENCH APPARATUS AND METHOD

[76] Inventors: Michael V. Butler, 2909 E. Glenn, Tucson, Ariz. 85716; William J. Butler, 1024 W. King, Tucson, Ariz. 85705

[21] Appl. No.: 342,308

[22] Filed: Apr. 24, 1989

[51] Int. Cl.$^5$ .............................................. B60R 3/00
[52] U.S. Cl. ...................................... 182/92; 182/152; 182/129; 280/165
[58] Field of Search .................... 182/90, 92, 150, 152, 182/155, 156, 129; 280/165

[56] References Cited

U.S. PATENT DOCUMENTS

| | | | |
|---|---|---|---|
| 632,226 | 8/1899 | Menges | 182/70 |
| 2,378,678 | 6/1945 | Anderson | 280/165 |
| 2,575,573 | 11/1951 | Wiedman | 182/152 |
| 2,679,436 | 5/1954 | Viebrock | 182/150 |
| 2,772,720 | 12/1956 | Zody | 280/165 |
| 3,058,542 | 10/1962 | Rogalla | 182/155 |
| 3,976,163 | 8/1976 | Watkinson | 182/152 |
| 4,785,910 | 11/1988 | Tonkovich | 182/92 |
| 4,800,987 | 1/1989 | Liles | 182/92 |

OTHER PUBLICATIONS

American Van, 212 Gates, Rd. Little Ferry, N.J. 07643, Catalog 33, 1987, p. 26.

Primary Examiner—Reinaldo P. Machado
Attorney, Agent, or Firm—Victor Flores; Harry M. Weiss

[57] ABSTRACT

This invention discloses a vehicular step bench apparatus stabilized through coupling accessories provided for detachable connection to various portions of a vehicle to gain a safe access to elevated areas of a vehicle. The coupling accessories are mechanical attachments that effect a restraining relationship with a front and rear bumpers and wheel members of a vehicle to prevent tilting or tipping towards or away from the vehicle. The mechanical attachments include portions of chains, pivotal stop arms and other mechanical attachment structure. The foot support area is further made safe through the use of a foot traction aids in the form of friction pads adhesively attached to the foot support surface. The step bench apparatus is made portable through foldable structure provided beneath the foot support area for easy storage in a carrying case.

13 Claims, 2 Drawing Sheets

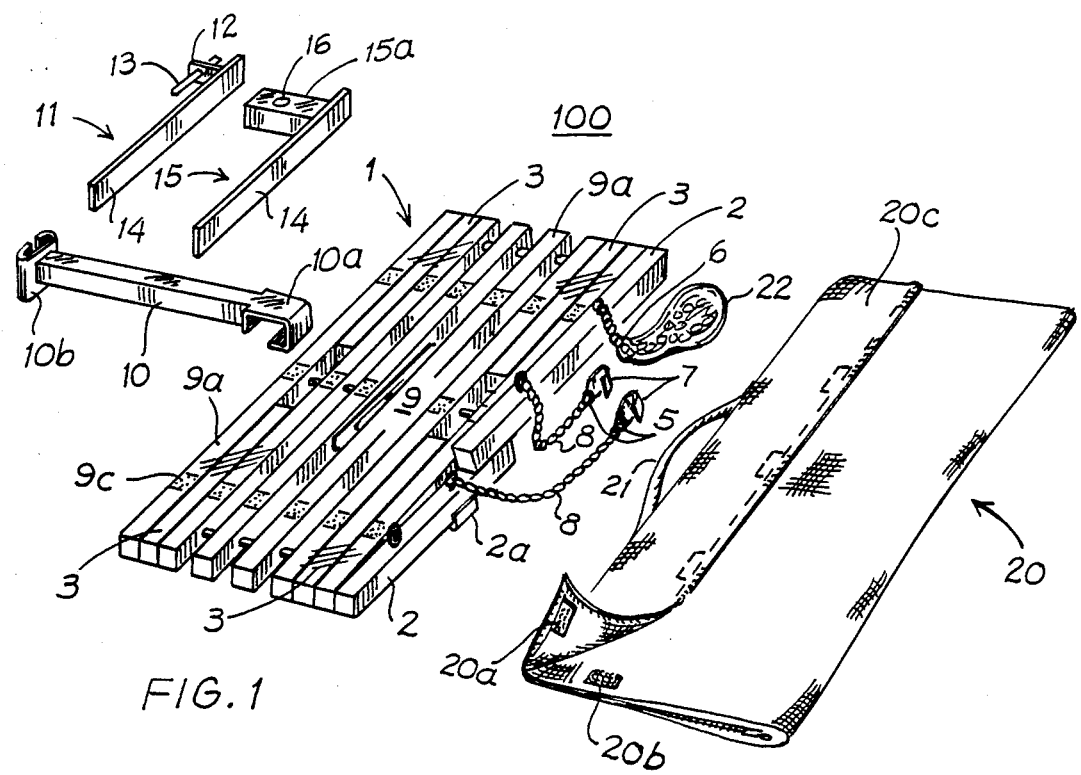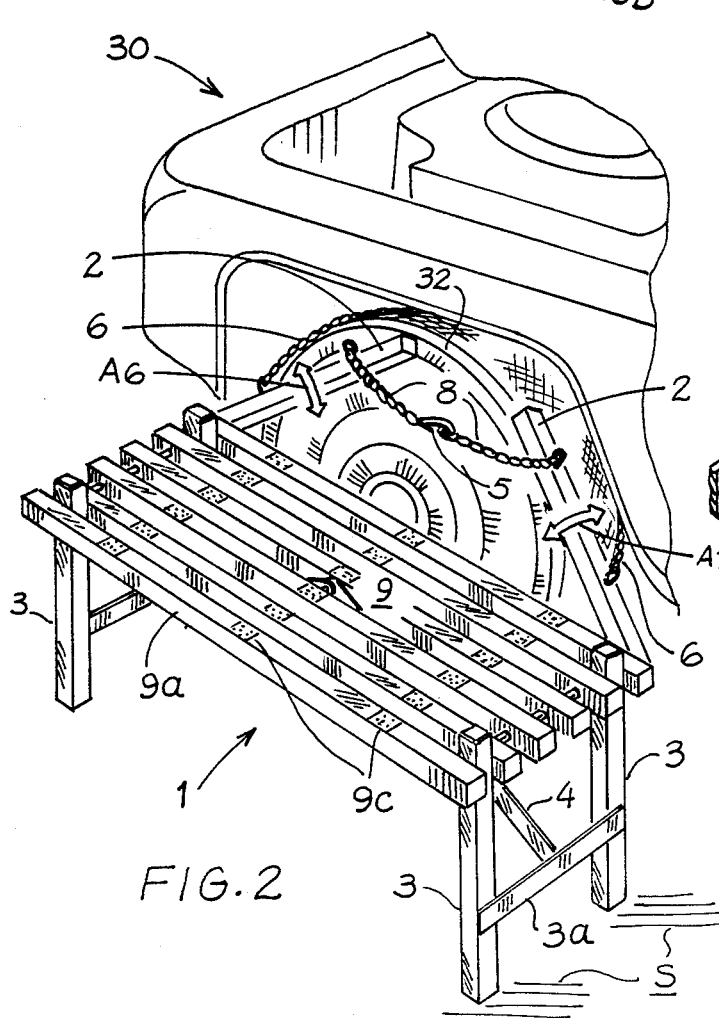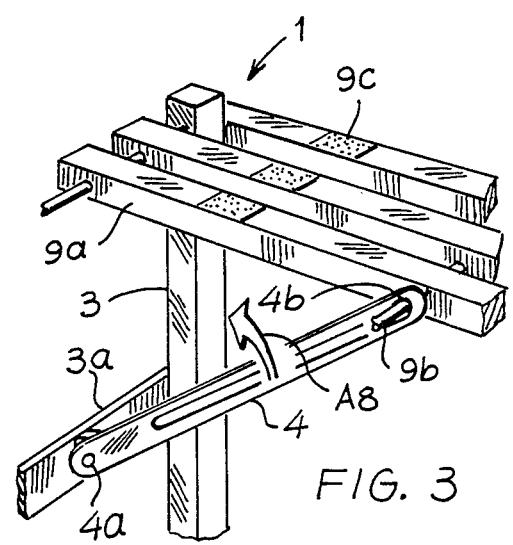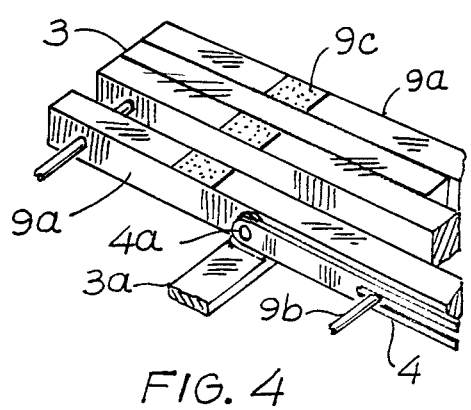

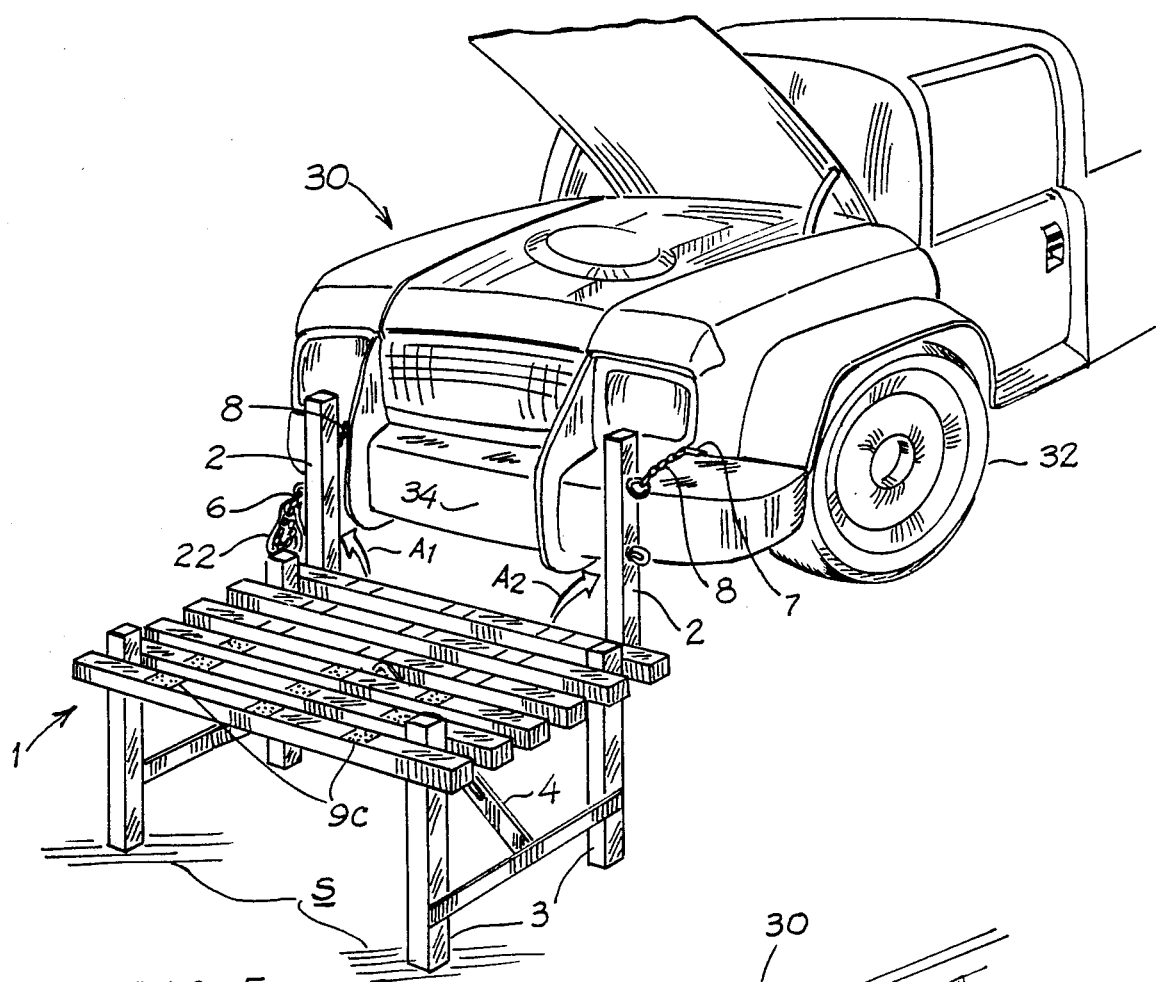
FIG. 5
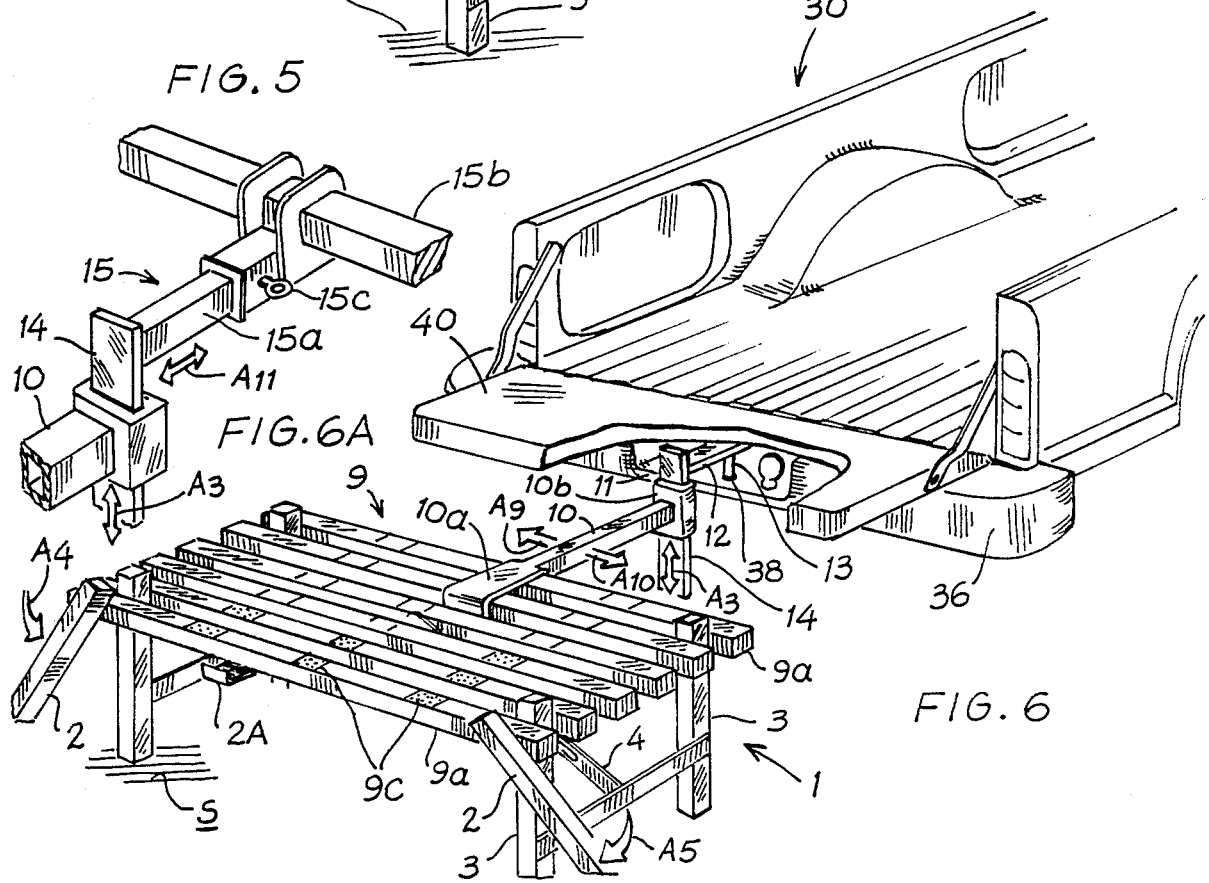
FIG. 6A
FIG. 6

STABILIZED VEHICULAR STEP BENCH APPARATUS AND METHOD

FIELD OF THE INVENTION

The present invention relates generally to foot support systems and more particularly, to a safe, portable foot support system which is stabilized through its coupling to a vehicle.

DESCRIPTION OF THE RELATED ART

It is known to use a bench apparatus for foot support in gaining access to elevated portions of a vehicle. It is also known that safety, stability and portability considerations in the use of such bench apparatus are important factors to consider in gaining access to elevated portions of a vehicle. One of the most available forms of a bench apparatus is that of a step bench. This type of apparatus gives the appearance of safety, but in reality, a step too close to the edge of the bench may induce it to tip resulting in the user falling and possibly sustaining bodily injury. Further, a person using the bench and leaning over a portion of a vehicle may have the tendency to tilt the bench away from the vehicle. The bench could then move out from under the person's feet resulting in a fall and possibly sustaining bodily injury. The foot support surface of such a bench can often be made slick or slippery with fluid spills making safe use of this bench even more difficult. Finally, a step bench apparatus often has fixed legs supporting the foot support area. This fixed leg support factor leads to limitations of portability and storage.

Persons who use a step bench apparatus for foot support often have a limited range of reach. They often step onto such an apparatus in a step-up fashion. They often reach up and or out to gain access to an elevated area. They often move laterally on the apparatus. These persons are placed at risk in these processes by various characteristics inherent in the design of the apparatus itself. Some of the key factors lacking in present step bench designs are: sideways stability, forward and backward stability, safe traction on the foot support surface, ease of use and portability. Therefore, a need is seen to exist for a safe, stable, portable step bench apparatus which is portable and easy to use, especially in elevated vehicular areas.

SUMMARY OF THE INVENTION

It is therefore a primary object of the present invention to provide a step bench apparatus which is safe, stable and portable.

It is another object of the present invention to provide a step bench apparatus that is stabilized through various means of coupling to a vehicle.

It is a more particular object of the present invention to provide a step bench apparatus that provides safe footing to the person using the apparatus.

It is another particular object of the present invention to provide a step bench apparatus that is portable.

The aforementioned objects of the present invention are accomplished, according to the present invention, by providing a safe, stable foot support step bench apparatus. The step bench apparatus is stabilized through coupling means provided for detachable connection to various portions of a vehicle. The foot support surface is further made safe through the use of a foot traction aids in the form of friction pads adhesively attached to the foot support surface. The step bench apparatus is made portable through foldable structure provided beneath the foot support area.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 1 is a perspective view of the step bench apparatus illustrating the folded step bench member, the friction pads on the foot support surface and various accessories, including a carrying case, a pouch containing a chain for wrapping around a vehicle wheel and the coupling members used for rear bumper attachment.

FIG. 2 is a perspective view of the step bench apparatus of the present illustrating the step bench apparatus safely coupled to a wheel member of a vehicle.

FIG. 3 is a cutaway perspective view of the present invention illustrating the foldable structure feature of the bench apparatus.

FIG. 4 is a cutaway perspective view of the present invention illustrating the legs folded and interleaved between horizontal members of the foot support area.

FIG. 5 is a perspective view of the step bench apparatus of the present invention illustrated as being safely coupled to the front bumper of a vehicle.

FIG. 6 is a perspective view of the step bench apparatus of the present invention illustrated as being safely coupled to the rear bumper of a vehicle using a pin mated to a hole on the rear bumper of the vehicle.

FIG. 6a is a perspective view illustrating an alternate means used for safely coupling the step bench apparatus of the present invention to a common trailer hitch attachment on a rear bumper of a vehicle.

DESCRIPTION OF THE PREFERRED EMBODIMENTS

Referring now to FIG. 1, in an exploded perspective view, the entire step bench apparatus 100 is shown having a step bench member 1 in a folded state and positioned relative to its carrying case 20. The accessory components are shown as a first rigid member 10 having a hooked end 10a and slide clamp end 10b for receiving a second rigid member 11 having a tang 14 integrally attached to plate 12 and cylindrical pin 13, alternate second rigid member 15 having a tang 14 integrally attached to a trailer hitch insert member 15a having a pinning hole 16 for pinning to a trailer hitch structure. Step bench member 1 has foot support area 9 formed by a plurality of foot support members 9a. Step bench 1 has coupling attachments in the form of a first chain portion 6 contained in a storage pouch 22, a set of second chain portions 8 having shackle hooks 7 detachably attached using S-hooks 5 and pivotal stop arms 2. The bench member 1 is provided with a foldable structure beneath foot support area 9 whereby legs 3 with the aid of slidable braces 4 are interleaved between support members 93. The pivotal stop arms 2 are shown in a stored folded position resting against stop tab 2a. The carrying case 20 is provided with a handle 21 attached to closure flap 20c that is secured using a plurality of mating VELCRO strips 20a and 20b.

Referring now to FIGS. 2, 5, 6 and 6a, where these perspective views show the basic operational configurations of step bench 1 in a restraining relationship with a front and rear bumpers and wheel members of a vehicle 30. Step bench 1 is shown in the foreground of each of these figures. Step bench 1 is intended to have all four legs 3 in contact with a ground surface, generally indicated by S.

In FIG. 2 and 5, the stabilization of step bench 1 is shown by coupling the step bench 1 to a vehicle 30 via the front bumper 34 and wheel 32, respectively. In FIG. 5, showing front of vehicle stabilization, chain portions 8 are provided with shackle hooks 7 for attachment to an upper edge of a vehicle's front bumper 34, while stop arms 2 are positioned for being in restraining contact with a front surface portion of the vehicle's front bumper 34, as shown by arrows A1 and A2. Each chain portion 8 is adjustable in length. In this configuration, each chain 8 is shortened to insure stabilizing contact between the pivotal stop arms 2 and the front bumper 34 of the vehicle 30. In FIG. 2, the stabilization is shown by having the step bench 1 positioned in close proximity with wheel 32, stop arms 2 rotated, as shown by arrows A6 and A7, for contact with the outer surface of wheel 32 and being latched by chain portions 8 using S-hooks 5 and having chain portion 6 wrapped around the back side of wheel 32. The two chains 8 and the two pivotal stop arms 2 combine to form opposition to chain 6 wrapping around the vehicle wheel 32. This combination insures stabilizing contact pressure between the vehicle wheel 32 and the two pivotal stop arms 2. The contact and restraint of stop arms 2 with chain portions 6 and 8 combine to insure stability of the bench apparatus 1 preventing it from tipping toward or away from the vehicle 30. Once the user has gained access to the support area 9, a plurality of friction pads 9c will aid in providing better foot traction.

Referring now to FIG. 6, the bench 1 is shown rigidly coupled to the rear bumper 36 of the vehicle 30. This rigid coupling provides stability to the foot support area 9 while allowing clearance for the tail gate 40 to swing down. As shown in FIG. 6, stabilization of the step bench 1 is achieved by coupling the step bench 1 to the rear bumper 36 of a vehicle 30 through the restraining interaction of an accessory assembly comprising a first rigid member 10 having a hooked end 10a for slidably attaching as shown by arrows A9 and A10 to foot support members 9a of a foot support area 9, a second rigid member 11 having integrally attached tang 14 for slideable attachment with slide clamp end 10b on first rigid member 10, as shown by arrow A3, a plate 12 with a cylindrical pin 13 for attaching to vehicle rear bumper 36 having a pinning hole 38, and in an alternate second rigid member 15, as shown in FIG. 6a, in the form of a trailer hitch attachable structure designed having a tang 14 for slidable attachment with slide clamp end 10b on first rigid member 10 and a trailer hitch insert member 15a for detachable attachment, as shown by arrow A11, using pin 15c to a trailer hitch structure 15b, typically mounted to the rear underside of a vehicle. As shown in FIG. 6, stop arms 2 may be rotated as shown by arrows A4 and A5 to be in contact with a ground surface S to provide additional stability.

Referring next to FIG. 3, in a cutaway perspective view, one leg 3 of step bench 1 is shown in its unfolded supporting position. The slidable brace 4 is shown pivotally coupled at end 4a to the leg brace portion 3a. The slidable brace 4 is also shown in a fully extended position and latched at slot end 4b to a crossbar 9b on the foot surface support area 9. This latched 4b to 9b coupling prevents the legs 3 from folding without a positive lifting of the slidable brace 4 as indicated by arrow A8.

Referring now to FIG. 4, in a cutaway perspective view, step bench 1 is shown in a folded position. In this state, legs 3 are folded and interleaved with the foot support members 9a. The slidable brace 4 is shown in its fully folded position.

A use of the bench apparatus 100 as discussed in the foregoing is to provide safe, stable foot support in gaining access to elevated areas on a vehicle. Because of the unique features of this bench apparatus 100, people using it will enjoy greater safety, added stability in reaching elevated areas, and ease of use in its portability. As illustrated, the bench apparatus 100 is used to gain access to elevated areas of a pick-up truck. The bench apparatus 100 may also find use on conventional vehicles, on motor homes and in and around mobile homes. However, the unique features of the bench apparatus 100 should not be limited to use on a vehicle. The unique method of stabilizing a step bench 1 is applicable to any object which will accommodate its features.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

We claim:

1. A step bench apparatus providing safe, stable foot support in gaining access to elevated areas of vehicles, comprising:
    bench member, said bench member having a foldable leg structure for supporting a foot support portion; and
    stabilizing means for coupling to a plurality of structural members of a vehicle, said stabilizing means including a first rigid member slidably coupled to said bench member and second rigid member having means at one end for mechanically coupling to said vehicle and having means at other end for slidably coupling to said first rigid member.

2. A step bench apparatus as recited in claim 1, wherein said second rigid member includes:
    tang;
    plate mechanically coupled perpendicular to said tang; and a solid cylindrical pin mechanically coupled perpendicular to said plate and parallel and adjacent to said tang, said pin being used for attaching said second rigid member to said vehicle.

3. A step bench apparatus as recited in claim 1, wherein said second rigid member includes:
    tang; and
    a rectangular tube hitching structure having a pinning hole through two opposite sides, said hitching structure being mechanically coupled perpendicular to said tang.

4. A step bench apparatus as recited in claim 1, wherein said bench member further includes:
    a plurality of friction pads attached to said foot support portion for providing the user with safety traction.

5. A step bench apparatus as recited in claim 1, wherein said bench apparatus further includes:

a carrying case, said carrying case having a flexible case body with sufficient capacity to store said bench apparatus in a folded state, said case body having a carrying handle attached to said body and a plurality of VELCRO pads for closure of said case, said carrying case having a detachable storage pouch for storing mechanical attachment accessories associated with said bench apparatus.

6. A step bench apparatus providing safe, stable foot support in gaining access to elevated areas of vehicles, comprising:

bench member, said bench member having a foldable leg structure for supporting a foot support portion; and stabilizing means for coupling to a plurality of structural members of a vehicle, said stabilizing means includes at least two pivotal stop arms pivotally coupled to said bench member, said at least two pivotal stop arms being pivotal for effecting suitable contact relationship with said vehicle for preventing tilting of said bench member towards said vehicle and restraining means for securing said at least two pivotal stop arms to said vehicle for preventing tilting of said bench member away from said vehicle.

7. A step bench apparatus as recited in claim 6, wherein said restraining means includes:

at least on chain portion coupled between said at least two pivotal stop arms and having sufficient length for wrapping around a wheel of said vehicle.

8. A step bench apparatus as recited in claim 6, wherein said restraining means includes:

at least two chained hook means coupled to said at least two pivotal stop arms for engaging a front bumper of said vehicle.

9. A method of providing a safe, stable foot support in gaining access to elevated areas on vehicles said method comprising the steps of:

providing a step bench apparatus, said apparatus comprising a bench member and a stabilizing means for coupling to a vehicle; placing said bench member proximate a vehicle; and stabilizing said bench member by coupling said stabilizing means to said vehicle, said step of providing a stabilizing means includes:

providing a restraining means member and
providing pivotal stabilizing members.

10. A method of providing a safe, stable fast support as recited in claim 9, wherein said stabilizing step includes:

positioning said pivotal stabilizing members in a contact relationship with said vehicle to prevent tilting of said bench towards vehicle; and attaching said restraining means to said vehicle for preventing tilting of said bench member away from vehicle.

11. A method of providing a safe, stable foot support in gaining access to elevated areas on vehicles said method comprising the steps of:

providing a step bench apparatus, said apparatus comprising a bench member and a stabilizing means for coupling to a vehicle; placing said bench member proximate a vehicle; and stabilizing said bench member by coupling said stabilizing means to said vehicle, said step of providing a stabilizing means includes providing a first rigid member slidably coupled to said bench member and a second rigid member having means at one end for mechanically coupling to said vehicle and having means at other end for slidably coupling to said first rigid member.

12. A method as recited in claim 11, wherein said stabilizing step includes:

coupling said second rigid member to a rear bumper hitch attachment of said vehicle.

13. A step bench apparatus providing safe, stable foot support in gaining access to elevated areas of vehicles, comprising:

a bench member;

a stabilizing means for coupling to a vehicle, said stabilizing means including at least one pivotal stop arm pivotally coupled to said bench member, said at least one pivotal stop arm being in a contact relationship with a portion of said vehicle for preventing tilting of said bench member towards said vehicle and a restraining means for preventing tilting of said bench member away from vehicle; and a carrying case for storing said step bench apparatus.

* * * * *